US009825759B2

United States Patent
Proulx et al.

(10) Patent No.: US 9,825,759 B2
(45) Date of Patent: Nov. 21, 2017

(54) SECURE SERVICE MANAGEMENT IN A COMMUNICATION NETWORK

(71) Applicant: Alcatel-Lucent Canada Inc., Ottawa (CA)

(72) Inventors: Denis A. Proulx, Kanata (CA); Carl Rajsic, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 712 days.

(21) Appl. No.: 13/937,182

(22) Filed: Jul. 8, 2013

(65) Prior Publication Data

US 2015/0010152 A1    Jan. 8, 2015

(51) Int. Cl.
H04K 1/00 (2006.01)
H04L 9/08 (2006.01)
(Continued)

(52) U.S. Cl.
CPC ........ H04L 9/0833 (2013.01); H04L 41/5054 (2013.01); H04L 45/02 (2013.01);
(Continued)

(58) Field of Classification Search
CPC . H04L 9/28; H04L 45/00; H04L 45/04; H04L 63/0428; H04L 63/065; H04L 63/102; H04L 12/4641; H04L 29/12028; H04L 29/12839; H04L 61/103; H04L 61/106; H04L 61/6022; H04L 41/5054; H04L 45/02; H04L 63/0272; H04L 9/0833
(Continued)

(56) References Cited

U.S. PATENT DOCUMENTS 7,111,163 B1 9/2006 Haney
7,440,452 B1 10/2008 Giniger et al.
(Continued)

FOREIGN PATENT DOCUMENTS

EP 14823601 12/2016
JP 2003101569 A 4/2003
(Continued)

OTHER PUBLICATIONS

U.S. Appl. No. 13/746,119 filed in the name of Carl Rajsic filed Jan. 21, 2013 and entitled "Service Plane Encryption in IP/MPLS Networks."
(Continued)

Primary Examiner — Gary Garcia
(74) Attorney, Agent, or Firm — Ryan, Mason & Lewis, LLP

(57) ABSTRACT

In one embodiment, a tunnel to be affected by configuration of a service in a network is identified and key information for the identified tunnel is obtained from a corresponding router. The tunnel is assigned to a key group based on the key information, and provisioning information associated with the tunnel on the router is updated based on the assigned key group in conjunction with configuration of the service. The updating of the provisioning information may comprise altering the key information on the router to include a key associated with the assigned key group. Also, one or more keys not associated with the assigned key group may be deleted from the router and from a management entity of the network.

22 Claims, 7 Drawing Sheets

(51) Int. Cl.
*H04L 12/751* (2013.01)
*H04L 12/24* (2006.01)
H04L 9/00 (2006.01)
H04L 29/06 (2006.01)

(52) U.S. Cl.
CPC ...... *H04L 63/0428* (2013.01); *H04L 63/0272* (2013.01); *H04L 63/065* (2013.01)

(58) Field of Classification Search
USPC ........................................................ 380/255
See application file for complete search history.

(56) References Cited

U.S. PATENT DOCUMENTS

| | | | |
|---|---|---|---|
| 7,509,491 B1* | 3/2009 | Wainner et al. ............... 713/163 | |
| 8,040,822 B2 | 10/2011 | Proulx et al. | |
| 8,132,000 B2 | 3/2012 | Lebovitz et al. | |
| 8,391,492 B1* | 3/2013 | Le Faucheur et al. ....... 380/277 | |
| 8,776,197 B2* | 7/2014 | King et al. ......................... 726/6 | |
| 8,792,501 B1* | 7/2014 | Rustagi .................. H04L 45/58 370/217 | |
| 2005/0138369 A1 | 6/2005 | Lebovitz et al. | |
| 2006/0184999 A1* | 8/2006 | Guichard et al. .................. 726/3 | |
| 2006/0198368 A1 | 9/2006 | Guichard et al. | |
| 2007/0016663 A1* | 1/2007 | Weis ............... 709/223 | |
| 2009/0187649 A1* | 7/2009 | Migault et al. ............... 709/223 | |
| 2010/0174899 A1* | 7/2010 | Lin et al. ...................... 713/153 | |
| 2010/0185850 A1* | 7/2010 | Liu ............... 713/156 | |
| 2010/0223458 A1* | 9/2010 | McGrew et al. ............. 713/153 | |
| 2010/0235914 A1* | 9/2010 | Proulx .................. H04L 12/413 726/23 | |
| 2010/0284302 A1 | 11/2010 | Proulx et al. | |
| 2010/0302973 A1* | 12/2010 | Lange ................. H04L 12/4641 370/254 | |
| 2010/0309907 A1* | 12/2010 | Proulx ............... H04L 41/0806 370/389 | |
| 2011/0035585 A1* | 2/2011 | Haddad ........................ 713/162 | |
| 2011/0099362 A1* | 4/2011 | Haga et al. ........................ 713/2 | |
| 2011/0142044 A1* | 6/2011 | Csaszar et al. ............... 370/390 | |
| 2012/0177054 A1* | 7/2012 | Pati ..................... H04L 12/4625 370/395.53 | |
| 2013/0042313 A1* | 2/2013 | Lambert .......................... 726/7 | |
| 2013/0219035 A1* | 8/2013 | Detienne et al. ............. 709/223 | |
| 2013/0311778 A1* | 11/2013 | Cherukuri et al. ........... 713/171 | |
| 2014/0115325 A1* | 4/2014 | Detienne et al. ............. 713/160 | |

FOREIGN PATENT DOCUMENTS

| | | |
|---|---|---|
| JP | 2004254271 A | 9/2004 |
| JP | 2006166028 A | 6/2006 |
| JP | 2010517330 A | 5/2010 |
| JP | 201341309 A | 2/2013 |
| WO | 2005008368 A2 | 1/2005 |
| WO | PCT/CA2014/050593 | 9/2014 |

OTHER PUBLICATIONS

U.S. Appl. No. 13/748,244 filed in the name of C. Rajsic et al. filed Jan. 23, 2013 and entitled "Control Plane Encryption in IP/MPLS Networks."
Alcatel-Lucent, "Alcatel-Lucent 7705 Service Aggregation Router," Mar. 2013, 6 pages.
S. Bryant et al., "Pseudo Wire Emulation Edge-to-Edge (PWE3) Architecture," Network Working Group, Request for Comments: 3985, Mar. 2005, 42 pages.
E. Rosen et al., "BGP/MPLS IP Virtual Private Networks (VPNs)," Network Working Group, Request for Comments: 4364, Feb. 2006, 47 pages.
J. De Clercq et al., "BGP-MPLS IP Virtual Private Network (VPN) Extension for IPv6 VPN," Network Working Group, Request for Comments: 4659, Sep. 2006, 18 pages.
E. Rosen et al., "Multicast in MPLS/BGP IP VPNs," Internet Engineering Task Force (IETF), Request for Comments: 6513, Feb. 2012, 88 pages.
S. Tanimoto et al., "A Study of Security Architecture in Multi-Homing VPN Service," Computer Security Symposium, Information Processing Society of Japan, Oct. 19, 2009, pp. 499-504, vol. 2009, No. 11 (English Abstract only).

* cited by examiner

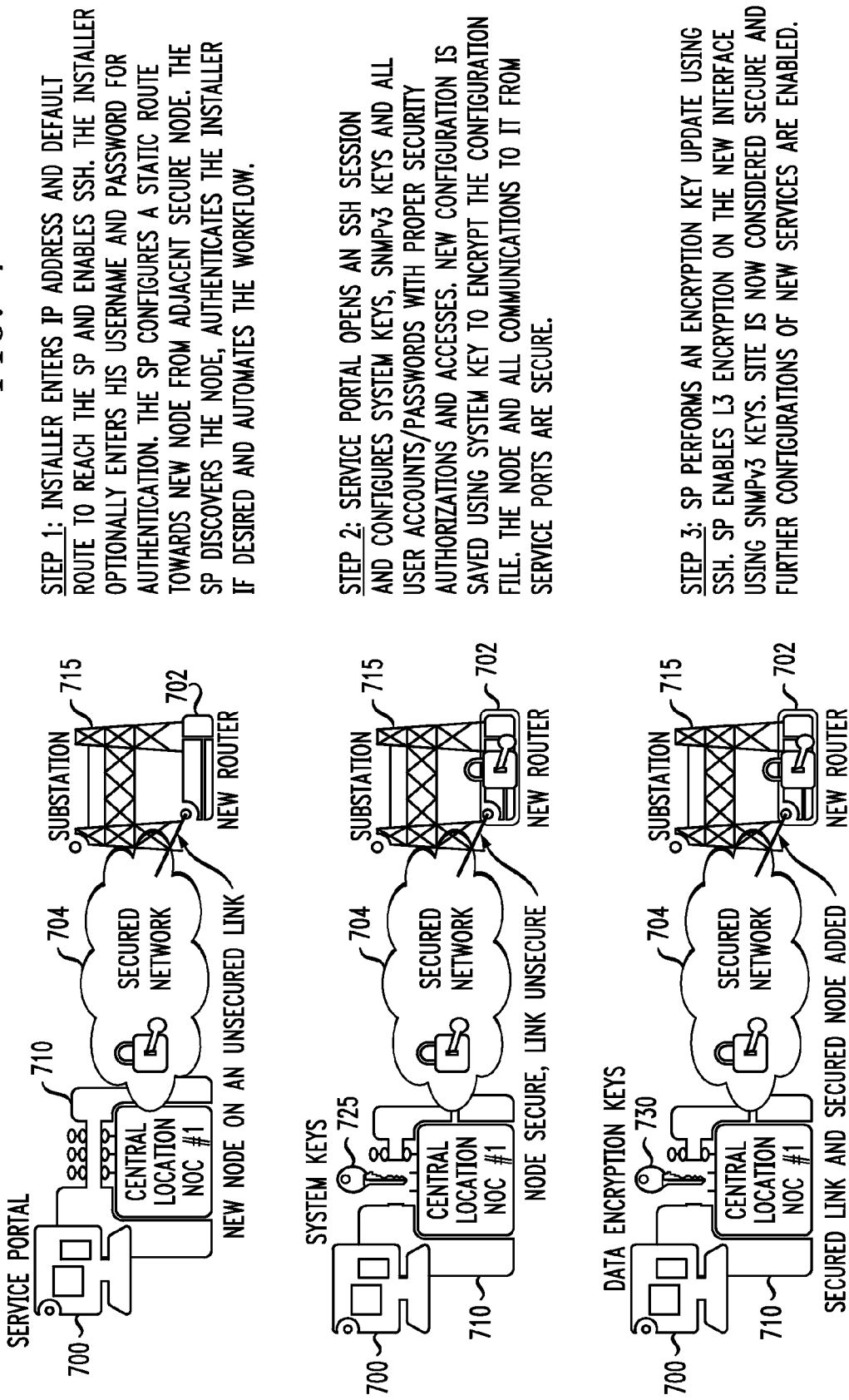

SECURE SERVICE MANAGEMENT IN A COMMUNICATION NETWORK

FIELD

The field relates generally to communication networks, and more particularly to techniques for managing encryption keys and other aspects of secure services configured in such networks.

BACKGROUND

Virtual Leased Line (VLL) is a service for providing Ethernet based point-to-point communication over Internet Protocol (IP) and Multi-Protocol Label Switching (MPLS) networks, or IP/MPLS networks. This technology is also referred to as Virtual Private Wire Service (VPWS) or Ethernet over MPLS (EoMPLS). VLL service provides a point-to-point connection between two customer edge (CE) routers. It does so by binding two attachment circuits (AC) to a pseudowire that connects two provider edge (PE) routers, wherein each PE router is connected to one of the CE routers via one of the attachment circuits. VLL typically uses pseudowire encapsulation for transporting Ethernet traffic over an MPLS tunnel across an IP/MPLS backbone. More information on pseudowires can be found in "Pseudo Wire Emulation Edge-to-Edge (PWE3) Architecture," RFC3985, IETF, March 2005, by S. Bryant and P. Pate.

Virtual Private LAN Service (VPLS) is an Ethernet service that effectively implements closed user groups via VPLS instantiations. In order to achieve full isolation between the user groups, VPLS dedicates a separate database, usually in the form of a forwarding information base (FIB), on network routers per VPLS instance. Each VPLS instance further requires that a dedicated mesh of pseudowire tunnels is provisioned between PE routers that are part of the VPLS.

Both VLL and VPLS use service access points (SAPs) to bind tunnel endpoints at PE router ports to their respective services. For example, in the case of VPLS, an SAP would specify physical identifiers (e.g. node, shelf, card, etc.) of the corresponding port and an identifier (e.g. VLAN5) of the VPLS.

Services such as VLL and VPLS provide the capability to securely communicate data packets among routers provisioned with the same service. Typically, thousands of such services are provisioned on a network, the data packet traffic that they each carry being kept separate from one another via special treatment provided at each router on which an instantiation of that service has been provisioned.

Each service has physical characteristics that in part define the service. These characteristics, also referred to a quality of service (QoS) parameters, include constant information rate (CIR), peak information rate (PIR), and maximum burst size (MBS) parameters and are often grouped into a policy for convenient provisioning of a service on a given router.

An SAP provisioned on a router is used to associate a service instance with a port of the router and a policy. An SAP can also associate an override with a policy, wherein a value of one of the QoS parameters is specified to be used instead of the value for that QoS parameter defined by the associated policy.

Although policies and policy overrides are local to a router, it is desirable to define and use them on a network-wide basis for consistency. However, in a large network with thousands of routers, each having dozens of ports, and the even larger number of unique combinations of QoS parameter values that can be defined and assigned to these ports, limitations on the maximum number of policies that a network management system managing the network can support are easily exceeded. Using policy overrides to alleviate this problem only exacerbates difficulties in achieving network-wide consistency in the provisioning of services. Furthermore, since policies and policy overrides can be provisioned both locally at a router and centrally via the network management system, keeping the provisioning of services in synchronization at the network management system and network routers is difficult.

These and other policy-related issues are addressed in U.S. Pat. No. 8,040,822, entitled "Configuring Communication Services Using Policy Groups," which is commonly assigned herewith and incorporated by reference herein. For example, embodiments disclosed therein provide a means of configuring services on a network in a manner that ameliorates one or more of the aforementioned problems.

Despite the considerable advances disclosed in the above-cited U.S. Pat. No. 8,040,822, a need remains for further improvements in configuring services on communication networks, particularly with regard to management of encryption keys and other aspects of secure services configured on such networks.

For example, traditional encryption on the Internet, such as that provided by Internet Protocol Security (IPsec), a protocol suite for securing IP communications by authenticating and encrypting each IP packet of a communication session, and which also includes protocols for establishing mutual authentication between agents at the beginning of the session and negotiation of cryptographic keys to be used during the session, is intended for providing users with security for sensitive data and applications.

IPsec was designed for authenticating and encrypting IP packets between two routers in a point-to-point fashion by establishing an encryption tunnel between those routers. IPsec was not designed for networks that carry a mix of IP and MPLS traffic for Layer 2 and Layer 3 services or for network level encryption and security between a multitude of routers communicating together.

IPsec is similarly unable to provide network level encryption and security between a large number of routers communicating between one another simultaneously without establishing a full mesh of IPSec tunnels between the routers. Creating full meshes of IPSec tunnels for inter-nodal encrypted traffic is cumbersome and inefficiently uses network and router resources.

Conventional techniques such as IPSec therefore fail to provide adequate management of encryption keys and other aspects of secure services involving encrypted tunnels in a communication network.

SUMMARY

Illustrative embodiments of the present invention provide communication networks in which secure services based on encryption keys are managed using key groups. Such arrangements help to avoid unnecessary replication of encryption keys or other types of keys within a communication network, thereby conserving network resources and improving network performance.

For example, some embodiments group existing key identifiers configured on network routers into key groups, thereby permitting identification of redundant key identifiers within the network that may be eliminated by reconfiguring one or more of the network routers. This provides a more efficient use of network resources by reducing the number of unused key identifiers within the network as well as facilitating distribution of new key identifiers.

In one embodiment, a tunnel to be affected by configuration of a service in a network is identified and key information for the identified tunnel is obtained from a corresponding router. The tunnel is assigned to a key group based on the key information, and provisioning information associated with the tunnel on the router is updated based on the assigned key group in conjunction with configuration of the service.

The updating of the provisioning information may comprise altering the key information on the router to include a key associated with the assigned key group. Also, one or more keys not associated with the assigned key group may be deleted from the router and from a management entity of the network.

Arrangements of this type allow unused key identifiers may be taken into account during the grouping operation so that such key identifiers can be eliminated during the reconfiguration, thereby promoting consistent usage of key identifiers throughout the network.

Such functionality also helps to maintain synchronization between key identifiers that are stored on router and network management system elements and used in configuration of secure services and associated tunnels.

BRIEF DESCRIPTION OF THE DRAWINGS

FIGS. 5, 6 and 7 are exemplary diagrams showing key group management processes in other embodiments.

DETAILED DESCRIPTION

Illustrative embodiments of the invention will be described herein with reference to exemplary communication networks, network devices and associated communication protocols. It should be understood, however, that the invention is not limited to use with the particular arrangements described, but is instead more generally applicable to any communication network application in which it is desirable to provide improved performance in terms of managing encryption keys and other aspects of secure services configured in the network.

Figure 1:
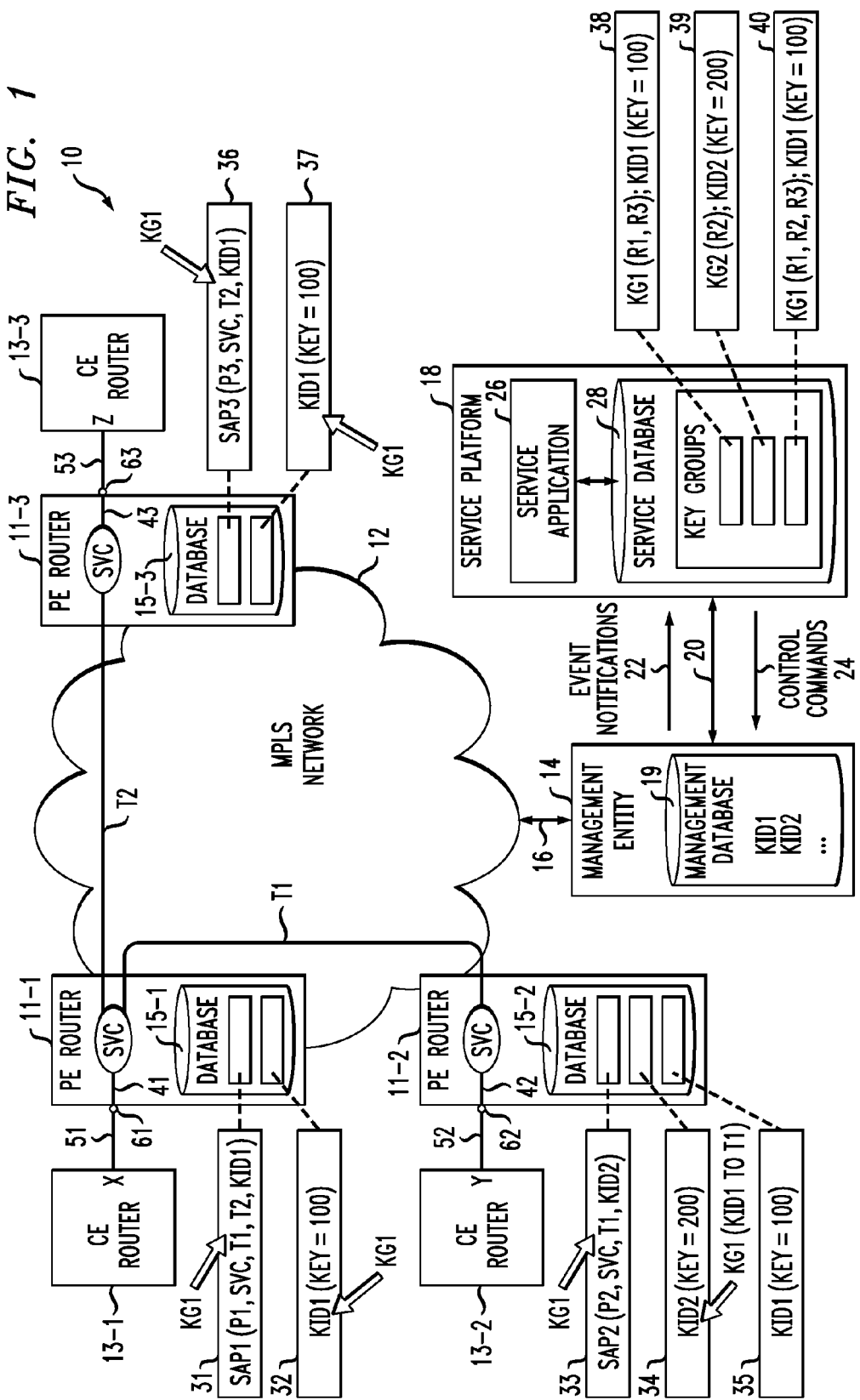
FIG. 1 shows a communication network that implements functionality for secure service management utilizing key groups in an illustrative embodiment.

FIG. 1 shows a communication network 10 configured to provide a VPLS service over an MPLS network 12. The MPLS network 12 is assumed to more particularly comprise an IP/MPLS network, and is an example of what is more generally referred to herein as a packet switching network (PSN), although the disclosed techniques are more generally applicable to other types of communication networks. The term "network" as used herein is therefore intended to be broadly construed, and may refer to a combination of multiple networks of different types.

The MPLS network 12 includes a first pseudowire tunnel T1 routed through the MPLS network 12 between a first PE router 11-1 and a second PE router 11-2. A service instance SVC of the VPLS service is instantiated at each of the PE routers 11-1, 11-2 and associates the first pseudowire tunnel T1 with the VPLS service. Accordingly, data packets associated with the VPLS service are communicated through the MPLS network 12 via the first pseudowire tunnel T1 between the first and second PE routers 11-1, 11-2.

The MPLS network 12 also includes a second pseudowire tunnel T2 routed through the MPLS network 12 between the first PE router 11-1 and a third PE router 11-3. A service instance SVC of the VPLS service is instantiated at the third PE router 11-3 and associates the second pseudowire tunnel T2 with the VPLS service. Accordingly, data packets associated with the VPLS service may also be communicated through the MPLS network 12 via the second pseudowire tunnel T2 between the first and third PE routers 11-1, 11-3.

A first CE router 13-1 is connected to a first interface port 61 of the first PE router 11-1 via a first attachment circuit 51. The first CE router 13-1 has a first MAC address X. Similarly, a second CE router 13-2 is connected to a second interface port 62 of the second PE router 11-2 via a second attachment circuit 52. The second CE router 13-2 has a second MAC address Y.

A first service access point 41 associates the first interface port 61 with the VPLS service SVC. The first PE router 11-1 includes a first database 15-1 associated with the VPLS service SVC. The first database 15-1 includes information that associates the service SVC provisioned on the first PE router 11-1 with the first pseudowire tunnel T1. Data packets received at the first port 61 from the first attachment circuit 51 that are associated with the VPLS service SVC are forwarded to the first pseudowire tunnel T1 in accordance with the information in the first database 15-1. Such information includes the forwarding information, which in this case causes data packets with a source MAC address being the first MAC address X to be forwarded over the first pseudowire tunnel T1 when their destination MAC address is the second MAC address Y. Similarly, data packets associated with the VPLS service SVC received by the first PE router 11-1 from the first pseudowire tunnel T1 are forwarded to the first interface port 61 in accordance with information in the first database 15-1 and the first service access point 41.

Similarly, a second service access point 42 associates the second interface port 62 with the VPLS service SVC, such that data packets received at the second port 62 from the second attachment circuit 52 that are associated with the VPLS service SVC are forwarded to the first pseudowire tunnel T1 in accordance with information in the second database 15-2. Such information includes forwarding information, which in this case causes data packets with a source MAC address being the second MAC address Y to be forwarded over the pseudowire tunnel T1 when their destination MAC address is the first MAC address X. Similarly, data packets associated with the VPLS service SVC received by the second PE router 11-2 from the first pseudowire tunnel T1 are forwarded to the second interface port 62 in accordance with information in the second database 15-2 and the second service access point 42.

Typically, there would be multiple pseudowire tunnels connecting multiple PE routers. In some cases these tunnels form a fully connected mesh interconnecting the PE routers. In any case, when there are multiple pseudowire tunnels for a given service that terminate on a PE router, a database is used at that router to determine over which of the tunnels a data packet should be forwarded to reach its destination. This determination is made based on the destination MAC or IP address of the data packet. A MAC address is a 48 bit address that is generally unique and dedicated to a given network interface card or adapter of a network device. A MAC address is also known as a hardware address. An IP address is a 32 bit (IPv4) or 128 bit (IPv6) address that is generally unique to a network device but is assignable in software.

In view of foregoing it should be clear that data packets associated with the VPLS service SVC can be communicated between the first and second CE routers 13-1, 13-2 via their respective attachment circuits 51, 52, the first and second PE routers 11-1, 11-2, and the first pseudowire tunnel T1.

A third CE router 13-3 is connected to the third PE router 11-3 via a third attachment circuit 53 connected to a third interface port 63 at the third PE router 11-3. The third CE router 13-3 has a third MAC address Z.

In a similar manner as described earlier for the first and second service access points 41, 42, a third service access point 43 associates the third interface port 63 with the VPLS service SVC instantiated on the third PE router 11-3.

The third PE router 11-3 includes a third database 15-3 associated with the VPLS service SVC. The third database 15-3 includes information that associates the VPLS service SVC provisioned on the third PE router 11-3 with the second pseudowire tunnel T2. Data packets received at the third port 63 from the third attachment circuit 53 that are associated with the VPLS service SVC are forwarded to the second pseudowire tunnel T2 in accordance with information in the third database 15-3. Such information includes forwarding information, which in this case causes data packets with a source MAC address being the third MAC address Z to be forwarded over the second pseudowire tunnel T2 when their destination MAC address is the first or second MAC addresses X, Y. Similarly, data packets associated with the VPLS service SVC received by the third PE router 11-3 from the second pseudowire tunnel T2 are forwarded to the third interface port 63 in accordance with information in the third database 15-3 and the third service access point 43.

It should be noted that tunnels provisioned between PE routers that are part of a configured service may be encrypted or unencrypted. Services such as VLL and VPLS use SAPs to bind encrypted or unencrypted tunnel endpoints at PE router ports to the corresponding services.

A given secure service may include one or more security characteristics that in part define the secure service. In some embodiments, these security characteristics include encryption key groups or other types of key groups that are associated with multiple routers for convenient provisioning of the service using one or more tunnels between the routers.

An encrypted or unencrypted tunnel provisioned on a router may be used to associate a service instance with a port and SAP of the router. An encrypted tunnel is associated with an encryption key identifier or Key ID which in the present embodiment is part of an encryption key group, although other types of key groups may be used in other embodiments. The key identifier in this embodiment specifies a particular key value to be used to perform the encryption. Use of symmetric keys is assumed, such that encryption and decryption are performed using the same key, although other embodiments are not limited to use with symmetric keys.

Accordingly, the term "key" as used herein is intended to be broadly construed so as to encompass, for example, a symmetric key used for encryption and decryption, as well as other types of cryptographic information such as public and private key pairs that are used to provide secure services in a communication network. Encryption keys will also be referred to herein simply as "keys."

In the present embodiment, key identifiers can be efficiently defined and managed on a network-wide basis using key groups. This is particularly important in a large network, which may include thousands of routers, each having hundreds of tunnels.

The service access points 41, 42 and 43 are also denoted herein as SAP1, SAP2 and SAP3, respectively, and the corresponding ports 61, 62 and 63 are also denoted herein as P1, P2 and P3, respectively. The PE routers 11-1, 11-2 and 11-3 are also denoted herein as routers R1, R2 and R3, respectively. This alternative notation is used below in conjunction with description of database entries.

As mentioned previously, the databases 15-1 to 15-3 include information that associates their respective service access points 41 to 43 and respective ports 61 to 63 with the VPLS service SVC. For example, the first database 15-1 includes a first entry 31 that associates the first service access point 41 (SAP1) with the first interface port 61 (P1), the VPLS service SVC, the tunnels T1 and T2, and an identifier of a first key KID1 on the first PE router 11-1. A second entry 32 in the first database 15-1 includes one or more parameters of the first key KID1. For example, the second entry 32 indicates that the first key KID1 has a key value KEY=100.

Similarly, the second database 15-2 includes a third entry 33 that associates the second service access point 42 (SAP2) with the second interface port 62 (P2), the VPLS service SVC, the tunnel T1, and an identifier of a second key KID2 on the second PE router 11-2. A fourth entry 34 in the second database 15-2 includes one or more parameters of the second key KID2. For example, the fourth entry 34 indicates that the second key KID2 has a key value KEY=200. It is assumed that the second key KID2 having key value KEY=200 is no longer to be used in the network, after processing that will be described in more detail below. Such processing eventually results in the replacement of entry 34 with an entry 35 using first key KID1 having key value KEY=100.

Similarly, the third database 15-3 includes a sixth entry 36 that associates the third service access point 43 (SAP3) with the third interface port 63 (P3), the VPLS service SVC, the tunnel T2, and an identifier of the first key KID1 on the third PE router 11-3. A seventh entry 37 in the third database 15-3 includes one or more parameters of the first key KID1. For example, the seventh entry 37 indicates that the first key KID1 has a key value KEY=100.

Still referring to FIG. 1, the communication network 10 includes a management entity 14 that is communicatively coupled to the PE routers 11-1 to 11-3 via a control connection 16 and the MPLS network 12. The management entity 14 would typically be a network management system capable of performing operation, administration and maintenance (OAM) type functions as well as secure service configuration functions on network elements in the MPLS network 12 such as the PE routers 11-1 to 11-3. This functionality of the management entity 14 includes the capability to receive reports of equipment, service, and provisioning related events from network elements of the MPLS network 12. The management entity 14 includes a management database 19, which includes entries for the identifiers of the first and second keys KID1 and KID2 and their associated key values.

The communication network 10 also includes a service platform 18 that is communicatively coupled to the management entity 14 via an open operating system (OS) interface 20. Using the open OS interface 20, the service platform 18 has access to event notifications 22, which include event notifications related to the event reports from the network elements. Further using the open OS interface 20 the service platform 18 can issue control commands 24 to the management entity 14 including commands to effect provisioning changes at the PE routers 11-1 to 11-3. The service platform 18 would typically be a laptop or desktop computer or workstation. The open OS interface 20 is illustratively an Extensible Markup Language (XML) interface, although other types of message interfaces could be used.

The service platform 18 executes a service application 26 that is in communication with a service database 28 on the service platform 18, although the service database 28 could also reside on the management entity 14 with access to it given by the open OS interface 20. The service application 26 is a software program that implements a method of configuring services in accordance with an embodiment of the invention. The service database 28 includes information on key groups that have been derived according to the method. For example, this information includes an eighth entry 38 for a first key group KG1 and a ninth entry 39 for a second key group KG2.

As indicated by the eighth entry 38, the first key group KG1 is associated with the first and third PE routers 11-1 and 11-3 and the key KID1 having key value KEY=100. The first and third PE routers are also referred to in the context of the key groups as R1 and R3, respectively.

As indicated by the ninth entry 39, the second key group KG2 is associated with the second PE router 11-2 and the key KID2 having key value KEY=200. The second PE router is also referred to in the context of the key groups as R2.

It is therefore apparent that tunnels T1 and T2 have different keys associated therewith. As noted above, it is assumed that the key KID2 is no longer to be used in the communication network 10. For tunnel T1, the key KID2 is to be replaced with the key KID1.

An additional tenth entry 40 replaces the eighth and ninth entries 38 and 39 in the service database 28. The tenth entry 40 redefines the first key group KG1 such that the first key group KG1 is associated with the first, second and third PE routers 11-1, 11-2 and 11-3 and the key KID1 having key value KEY=100. This redefined key group KG1 ensures that tunnels T1 and T2 are operating using the same key KID1 of the first key group KG1.

Exemplary steps that may be performed in order to generate the key groups KG1 and KG2 will be described in more detail later with reference to FIG. 2.

After generating the redefined key group KG1, the service application 26 issues control commands 24 to the management entity 14 to cause the key identifiers in entries 31 and 32 in database 15-1 on PE router 11-1, entries 33 and 34 in database 15-2 on PE router 11-2, and entries 36 and 37 in database 15-3 on PE router 11-3 to be replaced with the key group identifier for KG1. This is indicated in FIG. 1 by the KG1 arrows adjacent each of these entries. As a result of this reconfiguration, the entries now indicate that the service access points 41, 42 and 43 are associated with redefined key group KG1 having key KID1 with the key value KEY=100.

In some cases, the key value of the key associated with the key group to which the tunnel is assigned may already exist on the router. This is true for key KID1 on routers 11-1 and 11-3 in the FIG. 1 embodiment. Also, the key previously associated with a tunnel can be deleted from a corresponding router if it is not associated with any other tunnels on that router. Accordingly, in this example, the entry 34 relating to key KID2 can be deleted from database 15-2 on PE router 11-2. This entry 34 is replaced with an entry 35 that identifies key group KG1 as illustrated in the figure.

Unused keys can also be deleted from the management database 19 of management entity 14. For example, the key KID2 can be removed by deleting the corresponding entry in management database 19. Similarly, entry 39 defining key group KG2 can be deleted from the set of key groups in the service database 28.

Figure 2:
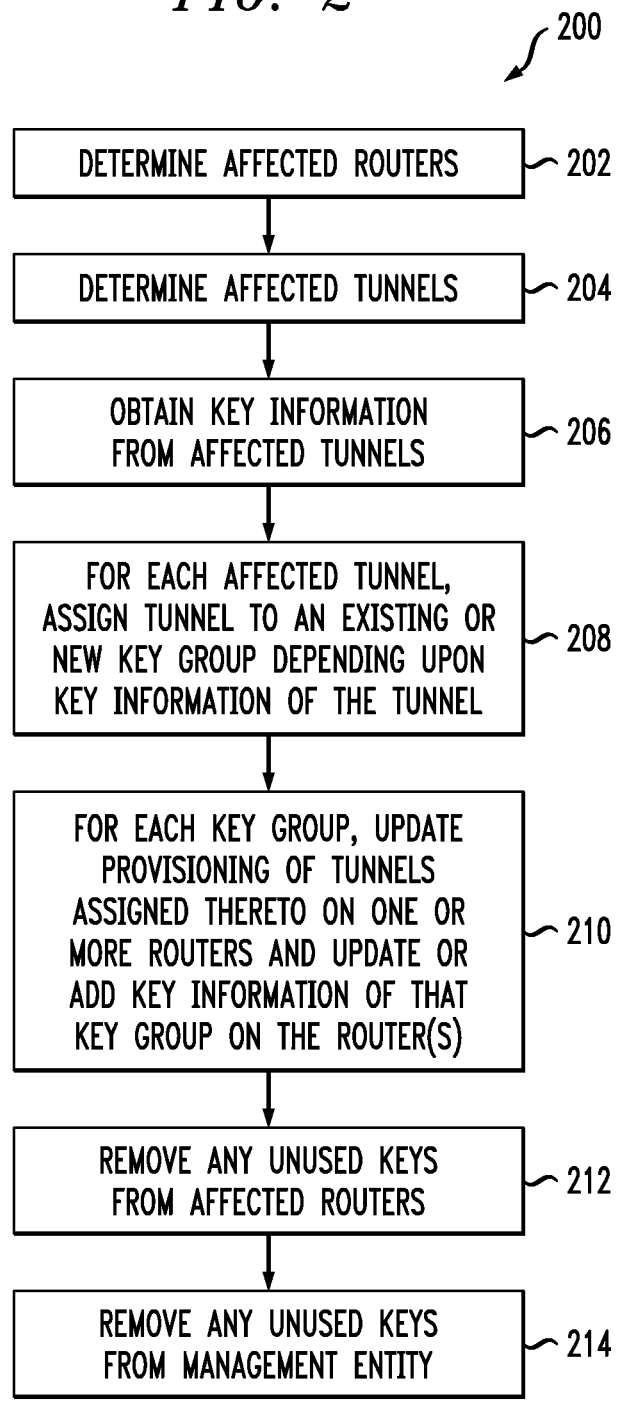
FIG. 2 is a flow diagram of an exemplary key group management process in another illustrative embodiment.

Referring to FIG. 2, a method 200 of configuring secure services in a PSN or other type of communication network will now be described with additional reference to FIG. 1. The method 200 includes steps 202 through 214 as illustrated.

The initial step 202 determines routers that may be affected by operations that are carried out as part of the configuration of the services. This determination could be the result of user input at the service platform 18 or management entity 14. For example, an operator could specify the affected PE routers 11-1 to 11-3.

Additionally or alternatively, the affected routers could be derived by the service application 26 from event notifications 22 received over the open OS interface 20. In this case the service application 26 would check the event notifications 22 to determine if any of them relate to provisioning of a key at the PE routers 11-1 to 11-3 or at the management entity 14. In the affirmative, the affected routers would be determined from the event notifications 22, either directly if explicitly indicated in the event notifications 22 or indirectly via information stored in the management database 19 or service database 28. The service application 26 may additionally send control commands 24 to the management entity 14 to cause the management entity 14 to extract any relevant key provisioning information from any router related to the event notifications 22, or from the management entity 14 itself.

The method then proceeds to step 204 which determines tunnels that may be affected by operations that are carried out as part of the configuration of the services. Typically, determining the affected tunnels would be done based on the determination of the affected routers in step 202. For example, the service application 26 would send control commands 24 to the management entity 14 to query which services and tunnels are provisioned on the affected routers. However, as with the determination in step 202, the determination in step 204 could be the result of user input at the service platform 18 or management entity 14. For example, an operator could specify the affected tunnels T1 and T2 and possibly also the affected service access points 41, 42 and 43. Additionally or alternatively, the affected tunnels and possibly also the affected service access points could be derived by the service application 26 from event notifications 22 received over the open OS interface 20. In either of the latter two cases, it is therefore possible to omit from the method 200 the initial step 202 of determining the affected routers.

The method then proceeds to step 206 to obtain key information related to the affected tunnels. For example, the service application 26 may issue control commands 24 to cause the management entity 14 to query network routers 11-1 to 11-3 for key information, such as the key information in the entries 31, 32, 33, 34, 36 and 37, and provide the key information to the service application 26.

The method then proceeds to step 208 in which each affected tunnel is assigned to an existing or new key group depending upon the key information obtained in the previous step 206. Step 208 may be performed by the service application 26 on any given tunnel by first comparing the obtained key information with that of existing key groups in the service database 28. The key information may comprise key identifiers and associated key values, as previously described in conjunction with FIG. 1.

If a matching key group is found the tunnel is assigned to that matching key group, otherwise a new key group is created and the tunnel is assigned to the new key group. For example, in the case of tunnel T1, it is associated with service access point 41 and key KID1 on router 11-1 and is associated with service access point 42 and key KID2 on router 11-2.

In this case, both KG1 and KG2 would be considered matching key groups for tunnel T1, as KG1 contains key KID1 associated with router 11-1 and KG2 contains key KID2 associated with router 11-2. However, key group KG1 is selected in this example because it is associated with more routers than key group KG2. Accordingly, tunnel T1 is assigned to key group KG1 that includes key KID1 having value KEY=100. The service application 26 therefore assigns the second service access point 42 and tunnel T1 to the first key group KG1. The second key KID2 having value KEY=200, which matches the key group KG2, will no longer be associated with tunnel T1.

After the assignment in step 208, the first service access point 41 and tunnels T1, T2 are assigned to the first key group KG1 on router 11-1, the second service access point 42 and tunnel T1 are assigned to the first key group KG1 on router 11-2, and the third service access point 43 and tunnel T2 are assigned to the first key group KG1 on router 11-3. Accordingly, both tunnels T1 and T2 assigned to key group KG1 will utilize the key KID1 having value KEY=100.

For each key group and for each tunnel assigned thereto, the method then proceeds in step 210 to update provisioning information of the tunnel on each router with an identifier of the key associated with the assigned key group as well as to update or add on the router any key information of the associated key.

For example, the service application 26 issues control commands 24 to cause the management entity 14 to update provisioning information of the first service access point 41 and tunnels T1 and T2 in the first entry 31 on router 11-1 by replacing the identifier of the first key KID1 with the identifier of the key group KG1. In a similar manner, the provisioning information of the second service access point 42 and tunnel T1 in the third entry 33 on router 11-2 is updated by replacing the identifier of the second key KID2 with the identifier of the key group KG1. Likewise, the provisioning information of the third service access point 43 and tunnel T2 in the sixth entry 36 on router 11-3 is updated by replacing the identifier of the first key KID1 with the identifier of the key group KG1. Similar identifier updates may be made in entries 32 and 37 to provide association with key group identifier KG1. Also, entry 34 associated with KID1 is deleted and replaced with entry 35 associated with KG1.

The method then proceeds to remove in step 212 any unused keys from routers affected by the updating of provisioning information in step 210. For example, the service application 26 may issue control commands 24 to cause the management entity 14 to remove the key KID2 of the fourth entry 34. As mentioned previously, this entry is deleted and replaced with a new entry 35.

Finally, any unused keys are removed in step 214 from the management entity 14. For example, the service application 26 may issue control commands 24 to cause the management entity to remove the second key KID2 from its management database 19.

Although not illustrated in FIG. 2, one or more additional steps associated with updating or removal of key groups in service database 28 may also be performed.

The particular process steps of FIG. 2 and other process steps referred to herein should be considered exemplary only, and additional or alternative steps can be used in other embodiments. For example, steps indicated as being performed serially may instead be performed at least in part in parallel with one another.

By executing the method 200, the service platform 18 provides several advantages such as more consistent use of keys across tunnels on a network-wide basis, efficient use of network management system resources to reconfigure secure services responsive to key changes, and facilitating maintenance of synchronization between router and network management system keys. Although the examples described in conjunction with the communication network of FIG. 1 are simplified for clarity of illustration, more significant advantages are obtained in larger networks which potentially have thousands of routers each having hundreds of tunnels.

Embodiments of the invention generally simplify the management of security encryption for MPLS networks and other communication networks including secure service provisioning. For example, encryption key distribution is simplified. In addition, workflows for new router deployment can be more easily automated. Also, generation of maps or other network views at service platform 18 showing provisioned encrypted and unencrypted services is simplified.

In other embodiments, tunnels could be created using an Encryption Key A for a first group of users and an Encryption Key B for a second group of users. Similarly, distinct sets of keys or other types of secure services based at least in part on one or more keys could be deployed for respective ones of multiple groups of users.

Techniques of the type disclosed herein can be used to ensure that each group of users for which services are provisioned in the network remain within a mesh of tunnels having the appropriate encryption key for that group. These groups may be established as domains or zones within the network.

Figure 3:
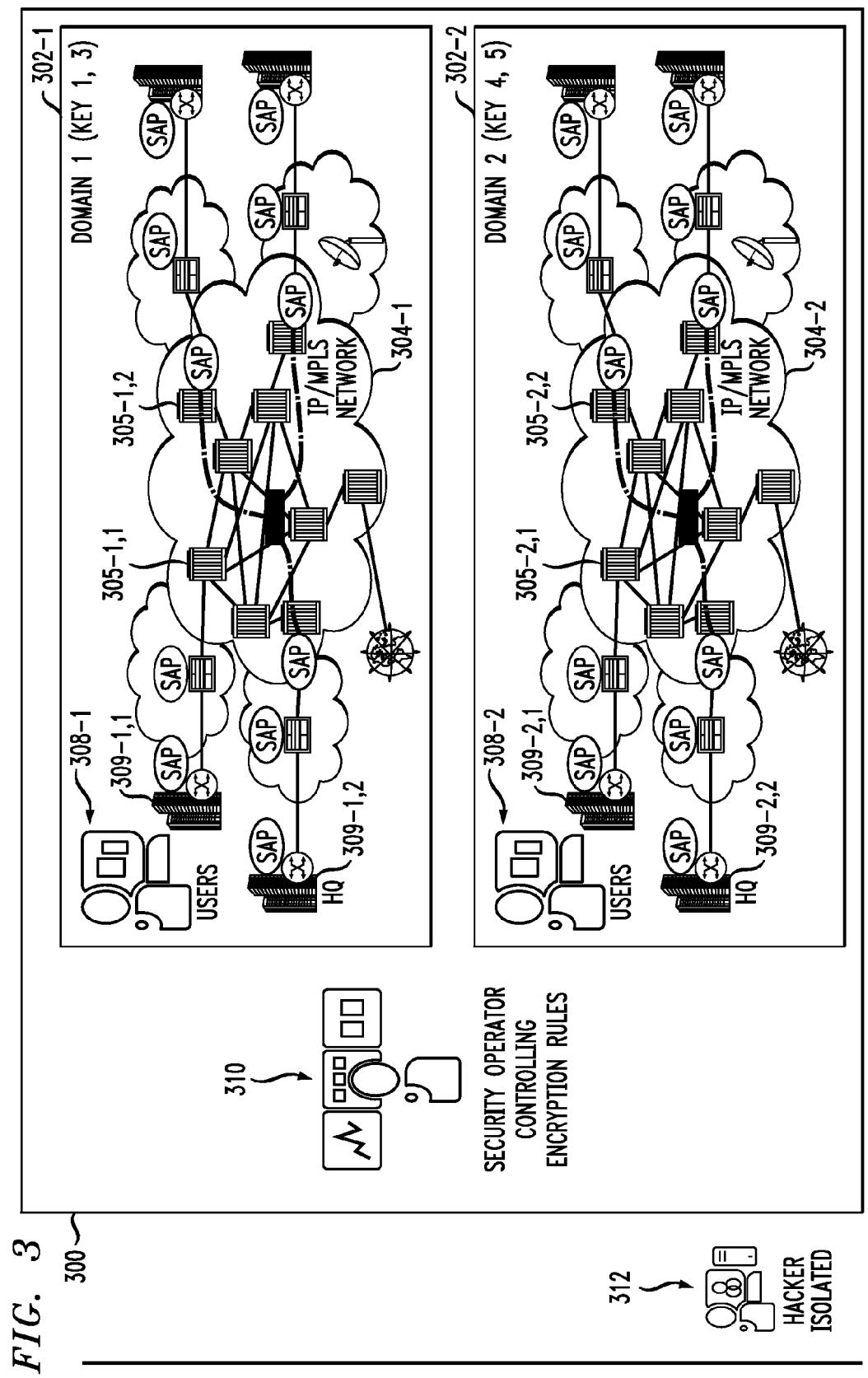
FIG. 3 shows another embodiment of the invention in which multiple domains have different encryption rules controlled by a security operator.

FIG. 3 shows an embodiment of the invention in which a system 300 comprises a plurality of domains 302-1 and 302-2, also denoted as Domain 1 and Domain 2, respectively. Domain 1 includes an IP/MPLS network 304-1 having multiple PE routers including PE routers 305-1,1 and 305-1,2 as well as other routers, endpoints and other equipment. Portions of this equipment are assumed to be associated with a plurality of users 308-1 that utilize processing platforms 309-1,1 and 309-1,2 associated with a headquarters (HQ) location of a first enterprise.

Similarly, Domain 2 includes an IP/MPLS network 304-2 having multiple PE routers including PE routers 305-2,1 and 305-2,2 as well as other routers, endpoints and other equipment. Portions of this equipment are assumed to be associated with a plurality of users 308-2 that utilize processing platforms 309-2,1 and 309-2,2 associated with an HQ location of a second enterprise.

Each domain 302-1 and 302-2 also includes multiple SAPs and associated service applications.

In this embodiment, a security operator 310 is assumed to utilize an associated service platform to control encryption rules for the domains 302-1 and 302-2. This involves establishing different sets of encryption keys for the different groups, using key group based provisioning of the type previously described. More particularly, the security operator establishes encryption rules in system 300 that include use of a first set of keys denoted as Key 1 and Key 3 in Domain 1, and use of a second set of keys denoted as Key 4 and Key 5 in Domain 2. These encryption rules serve to isolate a hacker 312 from the domains 302 of the system 300.

The users 308-1 and 308-2 in the respective domains 302-1 and 302-2 may also be grouped based on categories, and different keys may be associated with the respective categories. For example, the users may be separated into user categories such as customers, engineers, operations, first level support, etc. Also, the grouping may be based on roles, such as service provider task or customer task. The security operator 310 controls the encryption rules so as to enforce scope and span for asset security within each domain as well as to provide information regarding user interaction with the domains.

As another example of different key deployments for different users, consider a communication network having a plurality of zones.

In a first zone denoted Zone 1, assume that a voice service is configured that will use Encryption Key A. The corresponding SVC instances are created on the routers associated with the service, new tunnels are created between the routers, and the SVC instances on the routers are bound to the tunnels. Encryption Key A is then applied to all of the tunnels. If a data service is subsequently configured to use the same Encryption Key A, the above process is repeated but new tunnels are not created. Instead, the techniques disclosed herein facilitate reuse of the existing tunnels for the data service with Encryption Key A.

In a second zone denoted Zone 2, assume that a data service is configured that will use Encryption Key B. The corresponding SVC instances are created on the routers associated with the service, new tunnels are created between the routers, and the SVC instances on the routers are bound to the tunnels. Encryption Key B is then applied to all of the tunnels. If a video service is subsequently configured to use the same Encryption Key B, the above process is repeated but new tunnels are not created. Instead, the techniques disclosed herein facilitate reuse of the existing tunnels for the video service with Encryption Key B.

In a third zone denoted Zone 3, assume that an Internet service is configured that will use Encryption Key C for SAP L3 encryption. An SAP L3 interface is created on all routers, and Encryption Key C is applied to all of these interfaces.

The service platform 18 in such arrangements may be configured to display any mismatched keys and associated overrides if applicable.

Service changes in these embodiments are facilitated through the use of the disclosed techniques. For example, assume that the voice service using Encryption Key A in Zone 1 is to be removed. The corresponding SVC instances are identified and deleted from the associated routers. Any encrypted tunnels utilizing Encryption Key A but with no attached SVC instance are then deleted.

The key group based secure service control functionality disclosed herein can be used to facilitate satisfaction of regulatory requirements relating to information security in electrical power generation and distribution as well as numerous other public and private utility company applications.

For example, new regulatory requirements in the U.S. will necessitate that utility companies expand their investment in information security in order to protect the evolving "Smart Grid." Also, North American Electric Reliability Corporation (NERC) has defined national standards for security through NERC Critical Infrastructure Protection (NERC-CIP) requirements, of which encryption and authentication are important aspects. Likewise, similar requirements are appearing worldwide for corresponding applications, for example, specifications and requirements through the International Electrotechnical Commission (IEC). As indicated above, embodiments of the invention can be used to facilitate satisfaction of these and other regulatory requirements.

Figure 4:
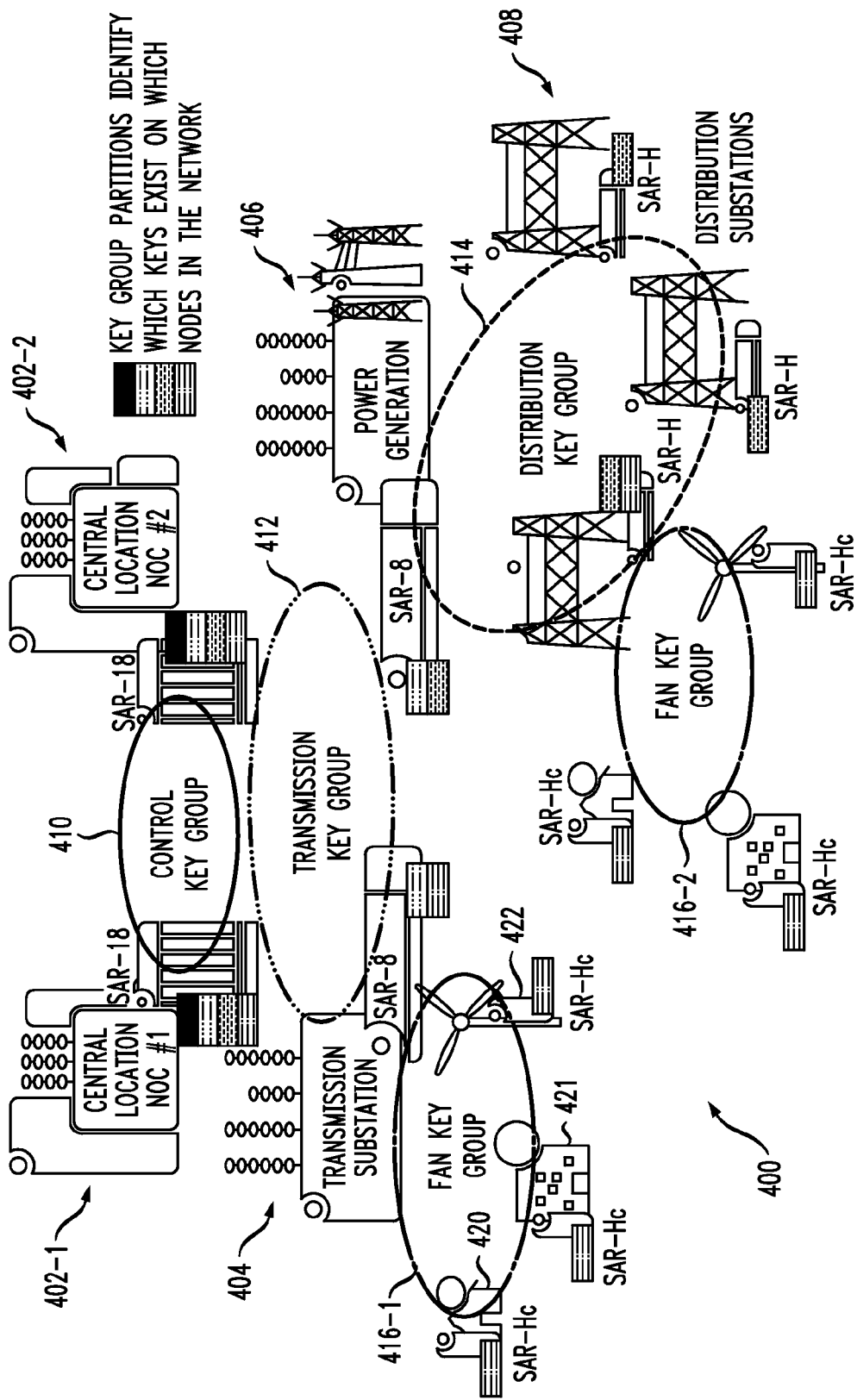
FIG. 4 illustrates use of key groups in a communication network of an electrical power generation and distribution system.

An embodiment of the invention utilizing key groups in an electrical power generation and distribution system 400 is shown in FIG. 4. The system 400 includes a communication network having multiple routers that are more particularly implemented as service aggregation routers (SARs) of different types. These illustratively include SARs denoted as SAR-18, SAR-8, SAR-Hc and SAR-H, which may be of a type commercially available from Alcatel-Lucent under Product No. 7705, although other types and arrangements of routers can be used in other embodiments. The routers are used to interconnect system elements including network operations centers (NOCs) 402-1 and 402-2 located at respective central locations, transmission substation 404, power generation plant 406 and distribution substations 408.

Each of the SARs may be viewed as a node of the communication network. Key group partitions are used to identify which keys exist on which nodes in the network. The key groups in this embodiment illustratively comprise a control key group 410, a transmission key group 412, a distribution key group 414 and first and second field area network (FAN) key groups 416-1 and 416-2. Distinct sets of one or more keys may be provisioned to each of the network nodes using these key groups, possibly using a service platform and associated management entity in a manner similar to that previously described in conjunction with FIGS. 1 and 2.

The FAN key groups 416 are associated with end users such as residential users 420 and business users 421 as well as additional energy sources such as wind energy sources 422. The users 420 and 421 may be sources as well as sinks of electrical power in the system 300 via solar installations or other user-based energy sources.

The key groups may be arranged in a security hierarchy in this example, with the control key group 410 having encryption keys associated with the highest level of security, followed by the transmission key group 412, the distribution key group 414 and the first and second FAN key groups 416-1 and 416-2. Accordingly, in such an arrangement, the nodes of the FAN key groups 416 do not contain keys to the more critical components of the communication network.

It is to be appreciated that the particular arrangements of network and system components shown in FIGS. 3 and 4 are exemplary only, and should not be construed as limiting in any way. Numerous other network and system configurations may be used in other embodiments.

Figure 5:
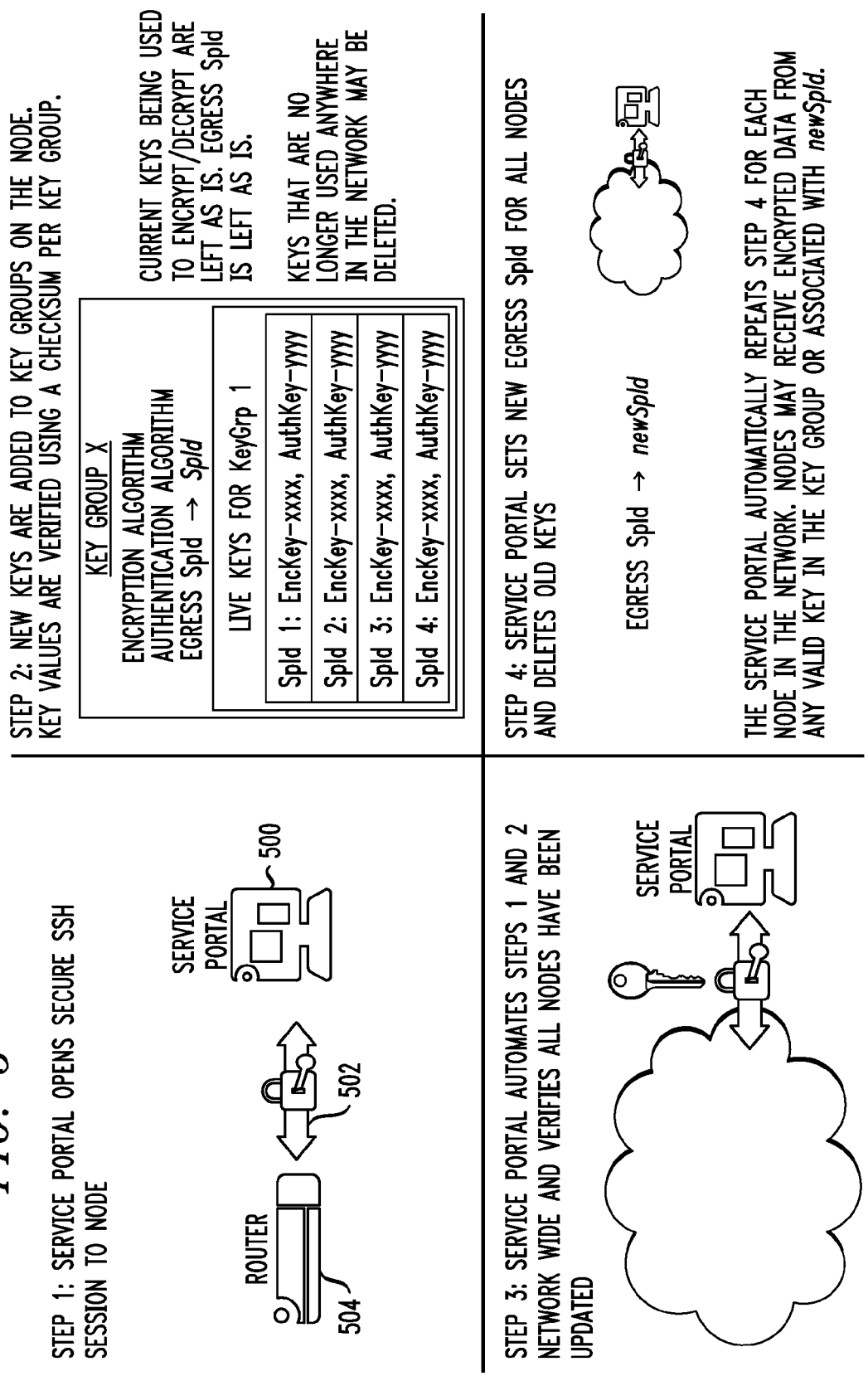

Referring now to FIG. 5, an exemplary process is shown for key group management on a given node comprising a router of a communication network. The illustrated process may be viewed as more particularly comprising a rekeying procedure implemented in the network.

In this process, a service portal 500 communicates over a secure connection 502 with a router 504. The service portal 500 in this embodiment may be viewed as corresponding generally to service platform 18 of FIG. 1. In some embodiments, the service portal 500 and other types of service platforms referred to herein may incorporate an associated management entity, such as management entity 14 of FIG. 1, instead of the management entity being implemented as a separate component of the network. The term "service platform" as used herein is therefore intended to be broadly construed so as to encompass, for example, service portals that may or may not include a management entity.

The process as shown in FIG. 5 comprises four distinct steps, denoted as Step 1 through Step 4. These steps are assumed to be performed primarily by the service portal 500 possibly operating in combination with an associated management entity, but in other embodiments can be performed at least in part by other components.

In Step 1, the service portal 500 opens secure connection 502 as a secure shell (SSH) connection to the router 504. The router 504 may comprise, for example, one of the SARs of the system 400 of FIG. 4. As indicated above, the router 504 is also referred to as a node of the communication network.

In Step 2, new keys are added to one or more key groups on the node, and key values of each key group are verified using a checksum computed on a per key group basis. As illustrated, an exemplary Key Group X may comprise information specifying an encryption algorithm, an authentication algorithm and an egress service parameter index/identifier (SpId). Other information relating to one or more secure services may be associated with a given key group in other embodiments.

One possible set of live keys for Key Group 1 is illustratively shown as comprising separate encryption and authentication keys for each of a plurality of SpIds denoted SpId 1 through SpId 4. The encryption keys are of the form EncKey-xxxx and the authentication keys are of the form AuthKey-yyyy. Current keys that are being used to perform operations such as encryption or decryption are left unchanged by the service portal 500, as are their egress SpIds. Keys that are no longer being used anywhere in the network may be deleted in a manner similar to that previously described.

In Step 3, the service portal 500 repeatedly performs Steps 1 and 2 in an automated manner on other nodes network wide and verifies that all nodes of the network with secure service functionality have been updated to reflect the current key groups and their associated keys.

In Step 4, the service portal 500 sets a new egress SpId for all nodes and deletes any old keys. This step may be performed in an automated manner for each of the appropriate nodes in the network. Nodes may receive encrypted data from any valid key in the key group or any key associated with the new egress SpId.

Figure 6:
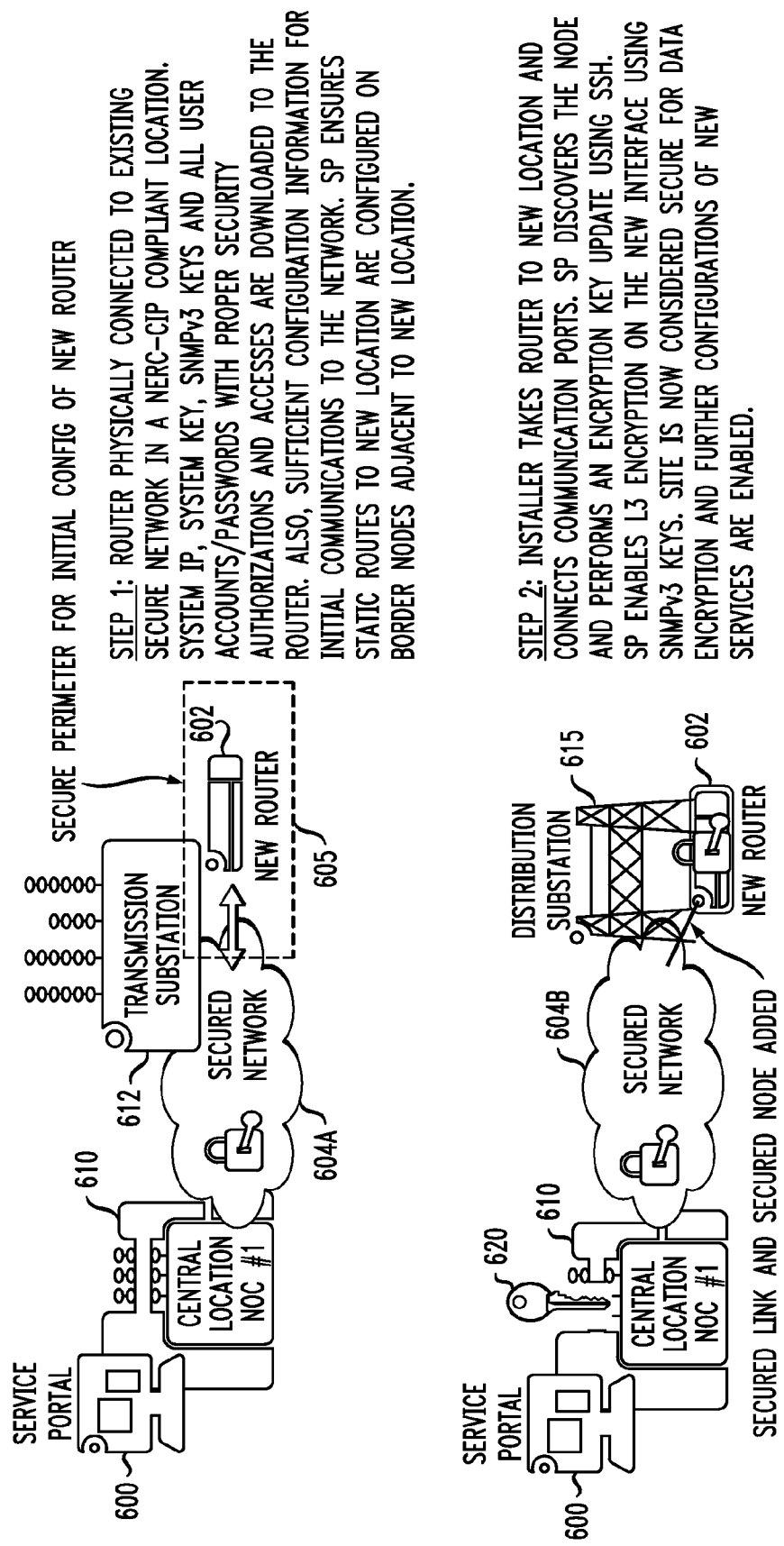

FIG. 6 illustrates a process for securing a given network node for encryption using a secure location for initial configuration. In this embodiment, a service portal 600 is used to secure a new router 602 via a secured network 604 that illustratively includes portions 604A and 604B which may partially overlap with one another. The service portal 600 is assumed to be implemented at a centrally-located NOC 610 and to communicate over respective secured network portions 604A and 604B with a transmission substation 612 and a distribution substation 615.

The new router is initially arranged in a secure perimeter 605 associated with the transmission substation 612 for configuration and is later relocated to distribution substation 615 for connection as a secure node via a secured link to secured network portion 604B. Such a scenario is expected to be common for utilities due to NERC-CIP requirements mandating a security perimeter and the management of nodes within that perimeter. The secure perimeter 605 may comprise, for example, a secure badge-access communications room in the transmission substation 612 or other facility such as an NOC.

The process as shown in FIG. 6 comprises two distinct steps, denoted as Step 1 and Step 2. These steps are assumed to be performed primarily by the service portal 600 possibly operating in combination with an associated management entity, but in other embodiments can be performed at least in part by other components. The service portal is also referred to as an SP in the figure.

In Step 1, the new router 602 is physically connected to the existing secure network portion 604A in a NERC-CIP compliant location bounded by the secure perimeter 605. Information such as system IP addresses, system keys, SNMPv3 keys and all user accounts and associated passwords with proper security authorizations and accesses are downloaded to the router. Also, the router is assumed to include sufficient configuration information to support initial communications with the network. The service portal 600 ensures that static routes to one or more new locations are configured on border nodes adjacent to any such new location(s).

In Step 2, an installer takes the new router 602 to a new location at the distribution substation 615 and connects its communication ports to the secure network portion 604B. The service portal 600 discovers the node and performs an encryption key update using SSH. This may involve, for example, the service portal enabling L3 encryption on the new interface using SNMPv3 keys. The new location is now considered secure for data encryption using the router 602 and one or more keys 620. Further configurations of any new secure services involving the router are enabled.

FIG. 7 illustrates a process for securing a given network node for encryption by securing the install location. This is another example of a scenario that is expected to be common for utilities due to NERC-CIP requirements.

In this embodiment, a service portal 700 is used to secure a new router 702 via a secured network 704. The service portal 700 is assumed to be implemented at a centrally-located NOC 710 and to communicate over secured network 704 with a distribution substation 715. The new router 702 is initially deployed as a new node on an unsecured link to network 704 as illustrated.

The process as shown in FIG. 7 comprises three distinct steps, denoted as Step 1, Step 2 and Step 3. These steps are assumed to be performed primarily by the service portal 700 possibly operating in combination with an associated management entity, but in other embodiments can be performed at least in part by other components. Again, the service portal is also referred to as an SP in the figure.

In Step 1, an installer of the new router 702 enters an IP address and default route to reach the service portal 700 and enables SSH. The installer optionally enters his username and password for authentication. The service portal 700 configures a static route through the secure network 704 towards the new node from an adjacent secure node. The service portal 700 then discovers the new node, authenticates the installer if desired, and automates the workflow.

In Step 2, the service portal 700 opens an SSH session and configures system keys, SNMPv3 keys and all user accounts and associated passwords with proper security authorizations and accesses (e.g. "Admin Admin" removed). The new configuration is saved using system key 725 to encrypt the configuration file. The node and all communications to it from the service portal are secure, although the link is still considered insecure at this point in the process.

In Step 3, the service portal 700 performs an encryption key update using SSH. This may involve, for example, the service portal enabling L3 encryption on the new interface using SNMPv3 keys. The new router 602 is now considered secure for data encryption using one or more keys 730. Further configurations of any new secure services involving the router are enabled. At this point, both the node comprising the new router 702 and its link to secured network 704 are considered secure.

The particular steps shown in the embodiments of FIGS. 5, 6 and 7 are presented by way of illustrative example only and numerous additional or alternative process steps may be used in other embodiments. For example, as indicated previously, steps illustratively shown as being performed serially in the embodiments of FIGS. 5, 6 and 7 may be performed at least in part in parallel with one another in other embodiments. Also, the ordering of some of the steps may be varied in other embodiments.

Other embodiments can utilize other types of communication services or protocols. For example, the communication network 10 may be used to implement Virtual Private Network (VPN) services in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. VPNs configured in accordance with RFC 4364 and RFC 4659 connect customer sites via tunnels, and allow IP unicast packets to travel from one customer site to another. The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

The routers 11-1, 11-2 and 11-3 in the FIG. 1 embodiment may be considered examples of respective nodes of the network 100. Numerous other types and arrangements of nodes may be used in other embodiments. The term "node" as used herein is intended to be broadly construed, and accordingly may comprise, for example, an entire network device or one or more components of a network device. The term "router" is also intended to be broadly construed, and should not be considered as limited to any particular type or types of routers, such as PE routers or SARs.

The nodes of the communication network 10 may be fixed or mobile. Accordingly, various combinations of fixed and mobile nodes may be used in a given communication network, while other networks may comprise all fixed nodes or all mobile nodes. Each of the nodes in a given communication network may be configured in substantially the same manner, or different configurations may be used for different subsets of the nodes within a given network.

It is assumed for certain embodiments disclosed herein that each such node corresponds to a separate network device. The network devices may comprise routers, switches, computers or other processing devices, in any combination. A given network device will generally comprise a processor and a memory coupled to the processor, as well as one or more transceivers or other types of network interface circuitry which allow the network device to communicate with the other network devices. The PE routers 11-1, 11-2 and 11-3 of the communication network 10 are therefore considered examples of what are more generally referred to herein as "network devices."

Also, the term "tunnel" as used herein is intended to be broadly construed and should not be construed as limited to the exemplary pseudowire tunnels referred to in conjunction with FIG. 1. The disclosed techniques are more generally applicable to a wide variety of different types of tunnels. For example, tunnels that would ordinarily be established between PE router pairs in accordance with RFC 6513 include P-tunnels of a Provider Multicast Service Interface (PMSI), which may comprise an Inclusive PMSI (I-PMSI) or a Selective PMSI (S-PMSI). Numerous other types of tunnels that may be subject to encryption may be used.

It is to be appreciated that the particular arrangement of components shown in FIG. 1 is exemplary only, and numerous alternative network configurations may be used in other embodiments. For example, different types and arrangements of routers or other network devices may be used and numerous other types of messaging in accordance with other communication protocols.

Each of the routers or other network devices may comprise a processor and a memory. The processor of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor and any associated internal or external memory may be used in storage and execution of one or more software programs for controlling the operation of the corresponding network device. Accordingly, certain functionality associated with routers 11-1, 11-2 and 11-3 or other network components such as management entity 14 and service platform 18 in the FIG. 1 embodiment may be implemented at least in part using such software programs.

The memories of the routers or other network components are assumed to include one or more storage areas that may be utilized for program code storage. A given such memory may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. Articles of manufacture comprising such computer-readable storage media are considered embodiments of the invention.

The memory may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The processor, memory, transceiver and other components of a given network device or other component of communication network 10 may include well-known circuitry suitably modified to implement at least a portion of the key group functionality described above. Conventional aspects of such circuitry are well known to those skilled in the art and therefore will not be described in detail herein.

It is to be appreciated that a given node or associated network device as disclosed herein may be implemented using additional or alternative components and modules other than those specifically shown in the exemplary arrangement of FIG. 1.

As mentioned above, embodiments of the present invention may be implemented in the form of articles of manufacture each comprising one or more software programs that are executed by processing circuitry of a network device or other processing device of a communication network.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Although certain illustrative embodiments are described herein in the context of particular communication protocols such as IP and MPLS, other types of networks can be used in other embodiments. As noted above, the term "network" as used herein is therefore intended to be broadly construed.

These and other embodiments of the present invention provide numerous advantages relative to conventional arrangements. For example, a comprehensive key management solution is provided that is suitable for all types of data and control traffic and associated secure services, including all Layer 2 VPN and Layer 3 VPN services and all IP/MPLS control plane functions. No parts of the network are left open to attack or are otherwise susceptible to eavesdropping or learning by a hacker or other adversary. These arrangements make key management simple, completely avoiding the complicated configurations that would otherwise be associated with large numbers of meshed tunnels in a typical communication network. Numerous secure domains can be easily created and managed using key groups, with access management control limited to security operators only. Also, hitless rekeying can be implemented so as to achieve zero traffic loss during rekeying. Yet another advantage is that strong network level encryption can be maintained even in the event of a network outage.

It should again be emphasized that the embodiments described above are for purposes of illustration only, and should not be interpreted as limiting in any way. Numerous modifications, variations and adaptations may be made to the embodiments of the invention described above without departing from the scope of the invention, which is defined in the claims. For example, other embodiments may use different types of network, device and module configurations, and alternative communication protocols and process steps for implementing key management based on key groups. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising:
   identifying a tunnel to be affected by configuration of a service in a network;
   obtaining key information for the identified tunnel from a corresponding router;
   assigning the tunnel to a key group based on the key information; and
   updating provisioning information associated with the tunnel on the router based on the assigned key group in conjunction with configuration of the service;
   wherein obtaining key information comprises receiving one or more key identifiers from the router;
   wherein assigning the tunnel to a key group based on the key information comprises:
      identifying a plurality of key groups that each include at least one of the received key identifiers; and
      assigning the tunnel to a selected one of the identified key groups;
   wherein selection of a particular one of the identified key groups is based on a number of routers associated with that key group; and
   wherein the tunnel comprises a pseudowire tunnel.

2. The method of claim 1 wherein identifying the tunnel comprises:
   identifying a plurality of routers to be affected by configuration of the service in the network; and
   identifying a plurality of tunnels associated with the identified routers that will be affected by configuration of the service in the network.

3. The method of claim 2 wherein the obtaining, assigning and updating are repeated for each of the identified tunnels.

4. The method of claim 1 wherein updating provisioning information comprises altering the key information on the router to include a key associated with the assigned key group.

5. The method of claim 4 further comprising deleting from the key information one or more keys not associated with the assigned key group.

6. The method of claim 1 wherein updating provisioning information comprises updating a service access point entry on the router to replace a key identifier with a key group identifier.

7. The method of claim 1 further comprising deleting from a management entity one or more keys not associated with any assigned key group.

8. The method of claim 1 wherein the plurality of key groups comprise a first key group associated with first set of enterprise resources having a first level of security and a second key group associated with a second set of enterprise resources having a second level of security different than the first level of security.

9. The method of claim 8 wherein the first key group comprises a control key group associated with one or more network operations centers of a utility and the second key group comprises one of a transmission key group associated with transmission infrastructure of the utility and a distribution key group associated with distribution infrastructure of the utility.

10. The method of claim 1 wherein the key group comprises a plurality of keys including at least one encryption key and at least one authentication key.

11. The method of claim 1 wherein the key information obtained for the identified tunnel from the corresponding router comprises at least one key identifier identifying a particular cryptographic key currently utilized by that tunnel.

12. The method of claim 1 wherein assigning the tunnel to a key group based on the key information permits at least a portion of the key information to be eliminated from the network.

13. An article of manufacture comprising a non-transitory computer-readable storage medium having embodied therein executable program code that when executed by at least one processing device causes said at least one processing device to:
- identify a tunnel to be affected by configuration of a service in a network;
- obtain key information for the identified tunnel from a corresponding router;
- assign the tunnel to a key group based on the key information; and
- update provisioning information associated with the tunnel on the router based on the assigned key group in conjunction with configuration of the service;
- wherein obtaining key information comprises receiving one or more key identifiers from the router;
- wherein assigning the tunnel to a key group based on the key information comprises:
  - identifying a plurality of key groups that each include at least one of the received key identifiers; and
  - assigning the tunnel to a selected one of the identified key groups;
- wherein selection of a particular one of the identified key groups is based on a number of routers associated with that key group; and
- wherein the tunnel comprises a pseudowire tunnel.

14. The article of manufacture of claim 13 wherein updating provisioning information comprises altering the key information on the router to include a key associated with the assigned key group.

15. A service platform comprising:
- an interface for communicatively coupling to a network management entity; and
- a service database for storing a plurality of key groups;
- wherein the service platform is configured to execute at least one service application that in cooperation with the network management entity:
  - identifies a tunnel to be affected by configuration of a service;
  - obtains key information for the identified tunnel from a corresponding router;
  - assigns the tunnel to a key group based on the key information; and
  - updates provisioning information associated with the tunnel on the router based on the assigned key group in conjunction with configuration of the service;
- wherein obtaining key information comprises receiving one or more key identifiers from the router;
- wherein assigning the tunnel to a key group based on the key information comprises:
  - identifying a plurality of key groups that each include at least one of the received key identifiers; and
  - assigning the tunnel to a selected one of the identified key groups;
- wherein selection of a particular one of the identified key groups is based on a number of routers associated with that key group; and
- wherein the tunnel comprises a pseudowire tunnel.

16. A communication network comprising the service platform of claim 15.

17. The communication network of claim 16 wherein the network comprises a Multiple Protocol Label Switching (MPLS) network.

18. The communication network of claim 16 wherein the router comprises a provider edge router of the network.

19. The service platform of claim 15 wherein updating provisioning information comprises altering the key information on the router to include a key associated with the assigned key group.

20. An apparatus comprising:
- at least one processing device comprising a processor coupled to a memory;
- wherein said at least one processing device is configured to identify a tunnel to be affected by configuration of a service in a network, to obtain key information for the identified tunnel from a corresponding router of the network, to assign the tunnel to a key group based on the key information, and to update provisioning information associated with the tunnel on the router based on the assigned key group in conjunction with configuration of the service;
- wherein obtaining key information comprises receiving one or more key identifiers from the router;
- wherein assigning the tunnel to a key group based on the key information comprises:
  - identifying a plurality of key groups that each include at least one of the received key identifiers; and
  - assigning the tunnel to a selected one of the identified key groups;
- wherein selection of a particular one of the identified key groups is based on a number of routers associated with that key group; and
- wherein the tunnel comprises a pseudowire tunnel.

21. The apparatus of claim 20 wherein said at least one processing device implements a service platform adapted for communication with a network management entity of the network.

22. The apparatus of claim 20 wherein updating provisioning information comprises altering the key information on the router to include a key associated with the assigned key group.

* * * * *